United States Patent
Brown et al.

(10) Patent No.: US 7,281,163 B2
(45) Date of Patent: Oct. 9, 2007

(54) MANAGEMENT DEVICE CONFIGURED TO PERFORM A DATA DUMP

(75) Inventors: Andrew Brown, Houston, TX (US); Christopher J. Frantz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 10/874,035

(22) Filed: Jun. 22, 2004

(65) Prior Publication Data

US 2005/0283672 A1     Dec. 22, 2005

(51) Int. Cl.
     *G06F 11/00*      (2006.01)
(52) U.S. Cl. .............................. 714/31; 714/4; 714/15; 714/27; 714/31; 714/37; 714/45; 714/48; 709/216
(58) Field of Classification Search .................... 714/4, 714/15, 27, 31, 37, 45, 48; 709/216
See application file for complete search history.

(56) References Cited

U.S. PATENT DOCUMENTS

| | | | |
|---|---|---|---|
| 6,480,972 B1 * | 11/2002 | Cromer et al. .................. 714/25 |
| 6,769,077 B2 * | 7/2004 | Vachon et al. .................. 714/43 |
| 6,973,598 B2 * | 12/2005 | Masuyama et al. ........... 714/45 |
| 7,114,102 B2 * | 9/2006 | Chan et al. .................... 714/37 |
| 2002/0166083 A1 * | 11/2002 | Anderson et al. ............. 714/37 |
| 2004/0267926 A1 * | 12/2004 | Rothman et al. ........... 709/224 |

OTHER PUBLICATIONS

Egan Ford, "xCAT Management Processor HOWTO," Nov. 2002, 12 pp.

* cited by examiner

*Primary Examiner*—Robert Beausoliel
*Assistant Examiner*—Charles Ehne

(57) ABSTRACT

In at least some embodiments, a computer system may comprise a CPU and a system memory coupled to the CPU. The computer system may further comprise a management device coupled to the CPU and the system memory. The management device is operable to permit remote control of the computer system by other computer systems. The management device is configured to receive a signal when the computer system malfunctions and, in response to receiving the signal, perform a data dump of at least some of the data in the system memory without involvement of the CPU.

26 Claims, 4 Drawing Sheets

MANAGEMENT DEVICE CONFIGURED TO PERFORM A DATA DUMP

BACKGROUND

A computer system may malfunction due to hardware and/or software errors. When such a malfunction occurs, the computer system may perform a memory data dump in which data (hereinafter called "data dump information") from system memory is copied to non-volatile memory storage such as a hard drive. The data dump information may contain, for example, information regarding the state of an operating system and hardware of the computer system. The data dump information may subsequently be analyzed to discover the cause of the malfunction, thereby allowing hardware and/or software providers to resolve malfunctions caused by their products.

Unfortunately, the ability of a computer system to successfully perform a data dump may be adversely affected by the malfunctions described above. During a system crash, if just one hardware or software component needed to perform the data dump is disabled, or is otherwise adversely affected, the ability of the computer system to perform the data dump may be reduced. For example, successfully performing a data dump to a local disc drive (i.e., a disc drive in the same system performing the data dump) may involve several factors including sufficient space to store the data dump information and correct operation of the disc drive, the disc drive firmware, the disc drive software drivers, and various components of the operating system that support the disc drive. The reliability of a computer system to perform a data dump may decrease when the complexity (e.g., number) of hardware and/or software operations implemented to perform the data dump increases.

SUMMARY

In at least some embodiments, a computer system may comprise a CPU and a system memory coupled to the CPU. The computer system may further comprise a management device coupled to the CPU and the system memory. The management device is operable to permit remote control of the computer system by other computer systems. The management device is configured to receive a signal when the computer system malfunctions and, in response to receiving the signal, perform a data dump of at least some of the data in the system memory without involvement of the CPU.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system crash" refers to any anomaly that may prompt a data dump to occur.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Embodiments of the invention are directed to systems and methods that utilize a management device to perform data dumps. As used herein, the term "management device" refers to any device that permits remote control functionality such as remote power control, remote system reset and/or remote operating system (OS) console of a computer system to other computer systems. In at least some embodiments, a management device is operable to perform a data dump that is not dependent on local disc drive software and/or hardware. In such embodiments, the management device may store data dump information in a memory of the management device or in a remote storage that may be accessible, for example, via a network connection or other connection types.

In embodiments of the invention, the management device may be configured to perform a data dump independently (or with minimal involvement) of the CPU and/or the main operating system of a computer system. Therefore, the management device is operable to perform the data dump even if a system crash disables, or otherwise renders ineffective, the CPU and/or elements of the main operation system.

Figure 1:
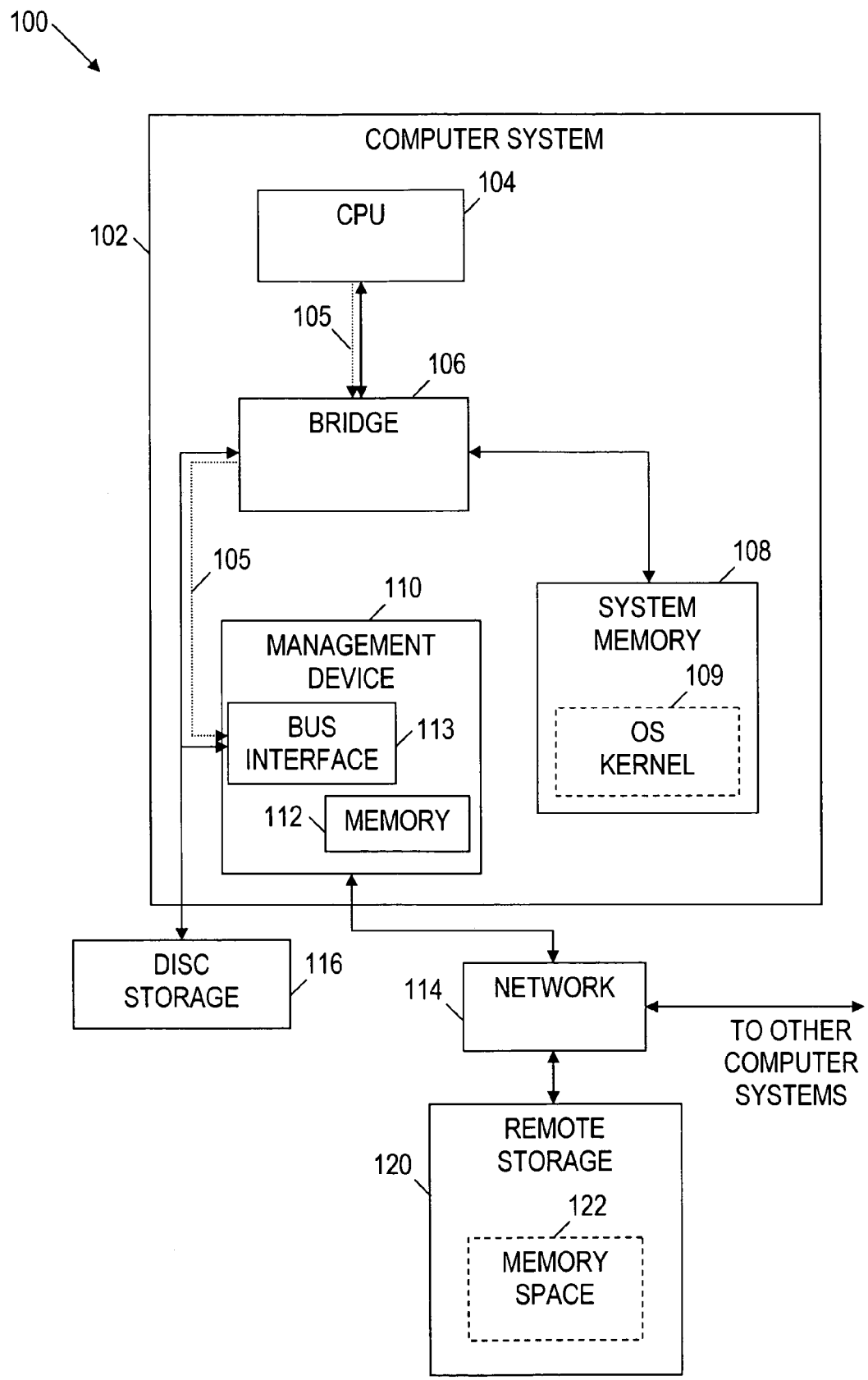
FIG. 1 illustrates a block diagram of a system in accordance with embodiments of the invention.

FIG. 1 illustrates a block diagram of a system 100 in accordance with exemplary embodiments of the invention. As shown in FIG. 1, the system 100 may comprise a computer system 102 that couples to a remote storage 120 via a network 114. The computer system 102 may comprise a management device 110 that couples to the network 114. The computer system 102 also may comprise a CPU (Central Processing Unit) 104 that couples to a system memory 108 and the management device 110 via a bridge device 106. As shown, the bridge device 106 and management device 110 also may couple to a disc storage 116 such as a hard drive or optical drive.

Via the bridge device 106, the CPU 104 may access (i.e., read) data and/or computer-readable instructions (hereinafter referred to collectively as "data") stored in the system memory 108. The CPU 104 also may write data to the system memory 108. By reading data, writing data, and performing other operations (e.g., mathematical operations), the CPU 104 is operable to perform any of a variety of tasks for the computer system 102. For example, the CPU 104 is operable to execute (i.e., run) an operating system program such as Windows, Unix, Linux, or other operating systems. The CPU 104 also may execute other software applications for the computer system 102.

When a system crashes (e.g., during the execution of an operating system, software application, or other function), the computer system 102 may stop normal operation and may no longer respond to user input. There are a variety of possible causes why the computer system 102 may crash. For example, a system crash may be caused when a forbidden memory address has been accessed, when there is a lack of available memory resources, when an infinite instruction loop exists, when the processor 104 attempts to switch between too many tasks and/or when multiple software applications wait for each other to complete a task before continuing.

To detect a system crash, the computer system 102 may monitor system crash parameters. As used herein, a system crash parameter may be any detectable feature of the computer system 102 that indicates that a system crash is about to occur or has already occurred. For example, a system crash parameter may comprise an attempt to access of a forbidden memory address, an amount of available memory less than a threshold amount, more than a threshold amount of tasks being handled by the processor, or the passing of more than a threshold amount of time since the processor performed an activity. When a system crash parameter is detected, the management device 110 may be notified.

In at least some embodiments, the management device 110 may be notified of a system crash by the main operating system of the computer system 102. For example, a fault handler and/or a system crash handler may be built into a "kernel" 109 of the main operating system. As used herein, the kernel 109 may be the central software module (code) of the main operating system and may begin execution before other operating system or non-operating system code is loaded. As shown in FIG. 1, the kernel 109 may be stored in and executed from the system memory 108. The fault handler and/or the system crash handler of the kernel 109 may monitor the system crash parameters described previously and, upon detection of a system crash parameter indicative of a system crash, assert a "system crash" signal 105 to the management device 110.

In at least some embodiments, the system crash signal may be received by the management device 110 via a bus interface 113 such as a UART (Universal Asynchronous Receiver/Transmitter) interface or "Virtual UART" interface. As used herein, a Virtual UART interface refers to any communication interface that appears to function as a UART to the main operating system. For example, the management device 110 may execute software that masks a PCI bus interface as a UART interface.

The system crash signal may instruct the management device 110 to perform a data dump. Additionally, the system crash signal may contain information (e.g., address regions of the system memory 108 that should be dumped) that the management device 110 is to use to perform the data dump.

After receiving the system crash signal, the management device 110 may function independently from the CPU 104 and the main operating system of the computer system 102 to perform the data dump. In some embodiments, firmware executed by the management device 110 may allow the management device 110 to access the system memory 108 without the use of the CPU 104 and/or the main operating system of the computer system 102. The transfer of data from the system memory 108 to the management device 110 may be implemented in a variety of ways such as direct memory access (DMA) or host memory access window.

The data dump information may thereafter be transferred from system memory 108 to one or more of a plurality of separate memory locations. There are a variety of factors that may be used to determine where the management device 110 transfers the data dump information. Some relevant factors may be the size of the data dump information, if the network 114 is functioning correctly, if available space exists in the remote storage 120, and if available space exists in the disc drive 116. Therefore, the management device 110 may evaluate such factors to determine the where to transfer the data dump information. In at least some embodiments, the management device 110 may be operable to store the data dump information in the memory 112, the remote storage 120, the disc drive 116, or other storage devices. An exemplary embodiment of how the management device 110 may function is illustrated in Table 1 below.

TABLE 1

| | Management Processor | Remote Storage | Disc Drive | Other |
|---|---|---|---|---|
| (1) Management processor has sufficient memory? | Y | N | N | N |
| (2) Network functional? | X | Y | (2) or (3) or both = N | N |
| (3) Remote storage functional and has sufficient memory? | X | Y | | N |
| (4) Disc drive functional and has sufficient memory? | X | X | Y | N |

Y = Yes, N = No
X = Don't care

As shown in Table 1, the management processor 110 may determine where to store data dump information according to: (1) whether the management processor 110 has sufficient memory; (2) whether the network 114 is functional; (3) whether the remote storage 120 is functional and has sufficient memory space 122; and (4) whether the disc drive 116 is functional and has sufficient memory.

In at least some embodiments, the management processor 110 may implement a prioritization scheme when performing a data dump based on a calculated or predetermined reliability. For example, in some embodiments, the predetermined reliability (during a system crash) of the devices of Table 1, from highest reliability to lowest reliability, may be the management processor 110, the remote storage 120, the disc drive 116, and the other storage devices.

Therefore, the management processor 110 may be configured to determine the answers to the questions (1)-(4) in Table 1 and store the data dump information accordingly. For example, if the answer to question (1) is "yes," the management processor 110 may store the data dump information in the memory 112 regardless of the answers to questions (2)-(4). If the answer to question (1) is "no" and the answers to questions (2) and (3) are "yes," the management device 110 may store the data dump information in the remote storage 120 regardless of the answer to question (4). If the answer to question (1) is "no," and the answer to either of the questions (2) and (3) is "no," and the answer to question (4) is "yes," the management processor 110 may store the data dump information in the disc drive 116. If the answers to questions (1)-(4) are all "no," the management processor 110 may store the data dump information in another storage device.

When the network 114 and remote storage 120 are available, the management processor 110 may transfer the data dump information to the remote storage 120 via the network 114 which may comprise, for example, an Ethernet network that implements a communication protocol such as TCP/IP (Transmission Control Protocol/Internet Protocol), FTP (File Transfer Protocol), TFTP (Trivial File Transfer Protocol), or NFS (Network File System). In at least some embodiments, the management device 110 may encrypt the data dump information for transfer to the remote storage 120 via the network 114.

The remote storage 120 may comprise a non-volatile storage such as a disc drive and may include memory space 122 that may be pre-allocated for storing data dump information. The benefits and/or need of storing data dump information in the remote storage 120 may increase when the data dump information comprises a large amount of data (e.g., several Gigabytes or more). For example, if portions of the disc drive 116 are pre-assigned to store a large amount of data dump information, those portions would be unusable for other applications thereby affecting the performance and/or the cost of the computer system 102. This problem is alleviated by providing the option of performing the data dump to the remote storage 120.

Additionally, storing data dump information in the remote storage 120 allows other computer systems (not shown) coupled to the remote storage 120 via the network 114 to analyze the data dump information without accessing the computer system 102. Therefore, the data dump information may be analyzed by the computer system 102 or by other computer systems coupled to the network 114.

In some embodiments, the management device 110 is operable to provide multiple copies of the dump data information. Also, the management device 110 may implement a naming convention, or other file management convention, to identify each of the multiple copies and to provide particulars of the occurrence of the system crash. For example, the management device 110 may group portions of the data dump information into different files according to data dump information details such as the source of the data, the data type, hardware associated with the data, software associated with the data, and timing factors associated with the data. By dividing (i.e., organizing) the data dump information into multiple files according to details such as those described above, an end user, a technician, or a manufacturer (hereinafter referred to as "user" or "users") may more easily determine the cause of a system crash. Organizing data dump information in this manner also may help a user to discover a solution that prevents future system crashes associated with the same cause, or a related cause, from occurring.

Furthermore, the management device 110 may function to reset the computer system 102 after a data dump, independent of the CPU 104 and/or the main operating system. As previously described, the CPU 104 and/or the main operating system may be, at least partially, disabled. Therefore, the management device 110 may allow the computer system 102 to perform the data dump and then automatically reset the computer system 102 so that the downtime (i.e., the time during which the computer system 102 does not function as normal) of the computer system 102 is minimized. Without the automatic reset capability of the management device 110, the computer system 102 may require user intervention (e.g., a user activating a physical reset of the computer system 102) to reset the system. Minimizing downtime may be of particular value when the computer system 102 is implemented as an Internet ("Web") server or other device for which minimal downtime may be desirable. In a Web server application, computer system downtime may create undesirable costs related to technical support, lost end-user productivity, loss of public confidence and/or other costs.

Figure 2:
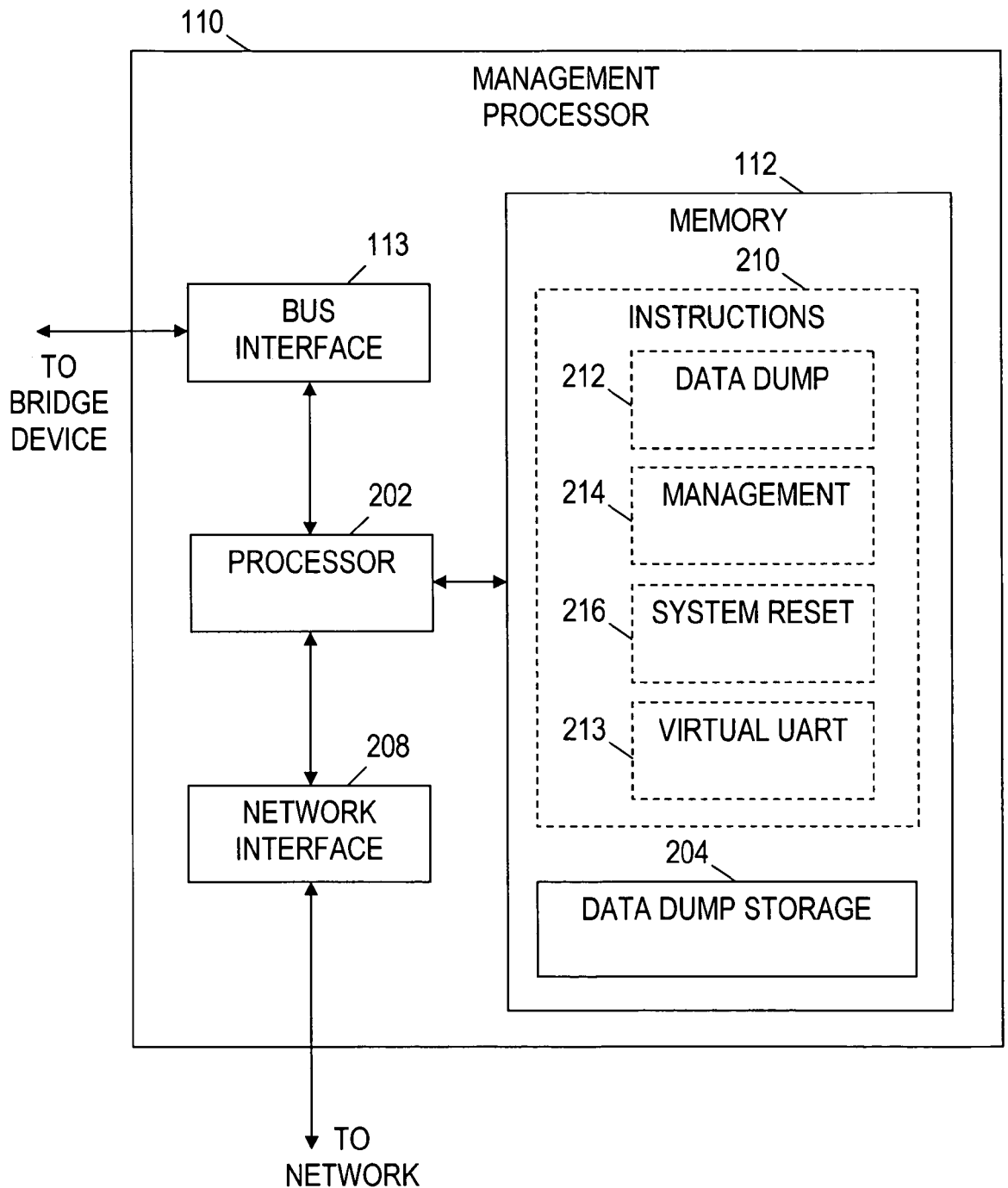
FIG. 2 illustrates a block diagram of a management device, used in the system of FIG. 1, in accordance with embodiments of the invention.

FIG. 2 illustrates a block diagram of a management device 110, for use with the system 100 of FIG. 1, in accordance with exemplary embodiments of the invention. As shown in FIG. 2, the management device 110 may comprise a processor 202 coupled to the memory 112. The processor 202 also may couple to a bus interface 113 and a network interface 208.

As described previously, the management device 110 may perform a variety of functions such as performing data dumps, organizing data dump information, and resetting the computer system 102. Accordingly, the memory 112 may store computer-readable instructions 210 executable by the processor 202 that allow the management device 110 to perform any or all of these functions. The management device 110 also may perform other functions and is not limited to performing functions related to data dumps and system crash recovery. In at least some embodiments, the management device 110 also may permit remote control functionality (e.g., remote power, remote reset, remote OS console) of the computer system 102 to other computers systems coupled to a network (e.g., the network 114). For example, the management device 110 may provide functionality referred to as "Lights-Out" technology.

As shown in FIG. 2, the instructions 210 may comprise data dump instructions 212, management instructions 214 and system reset instructions 216. When executed by the processor 202, the data dump instructions 212 permit the management device 110 to interpret the system crash signal described above. The data dump instructions 212 also may permit the processor 202 to execute read and write commands associated with performing the data dump. For example, the processor 202 may read predetermined addresses of the system memory 108 via the bus interface 113 and write the data to the data dump storage 204. Alternatively, the processor 202 may write the data to a remote storage (e.g., the remote storage 120) via the network interface 208 or a peripheral storage device (e.g., disc storage 116).

When executed by the processor 202, the management instructions 214 may cause the management device 110 to ascertain one or more factors associated with performing the data dump. For example, the management instructions 214 may cause the processor 202 to compare the amount of memory space available in the data dump storage 204 with a predetermined or approximated amount of data dump information. Additionally or alternatively, the management instructions 214 may cause the processor 202 to determine if a network (e.g., network 114) and a remote storage (e.g., the remote storage 120) are available for use. Therefore, if there is enough space in the data dump storage 204 to store the data dump information, the management instructions 214 may cause the processor 202 to transfer the data dump information from a computer system memory (e.g., the system memory 108) to the data dump storage 204. Otherwise, the management instructions 214 may cause the processor 202 to write the data dump information to a remote storage (e.g., the remote storage 120) via the network interface 208. If neither the data dump storage 204 nor the remote storage 120 available, the management instructions 214 may cause the processor to transfer the data dump information to another storage device such as a peripheral disc drive (e.g., the disc drive 116) of a computer system.

The management instructions 214 also may cause the processor 202 to organize the data dump information into groups and/or to create multiple copies of the data dump information as described above. When executed by the processor 202, the system reset instructions 216 may permit the management device 110 to reset a computer system (e.g., the computer system 102) after a data dump has been performed. When executed by the processor 202, the virtual UART instructions 213 may mask the bus interface 113 as a UART interface, even though the bus interface 113 may be a PCI bus interface or other interface.

Figure 3:
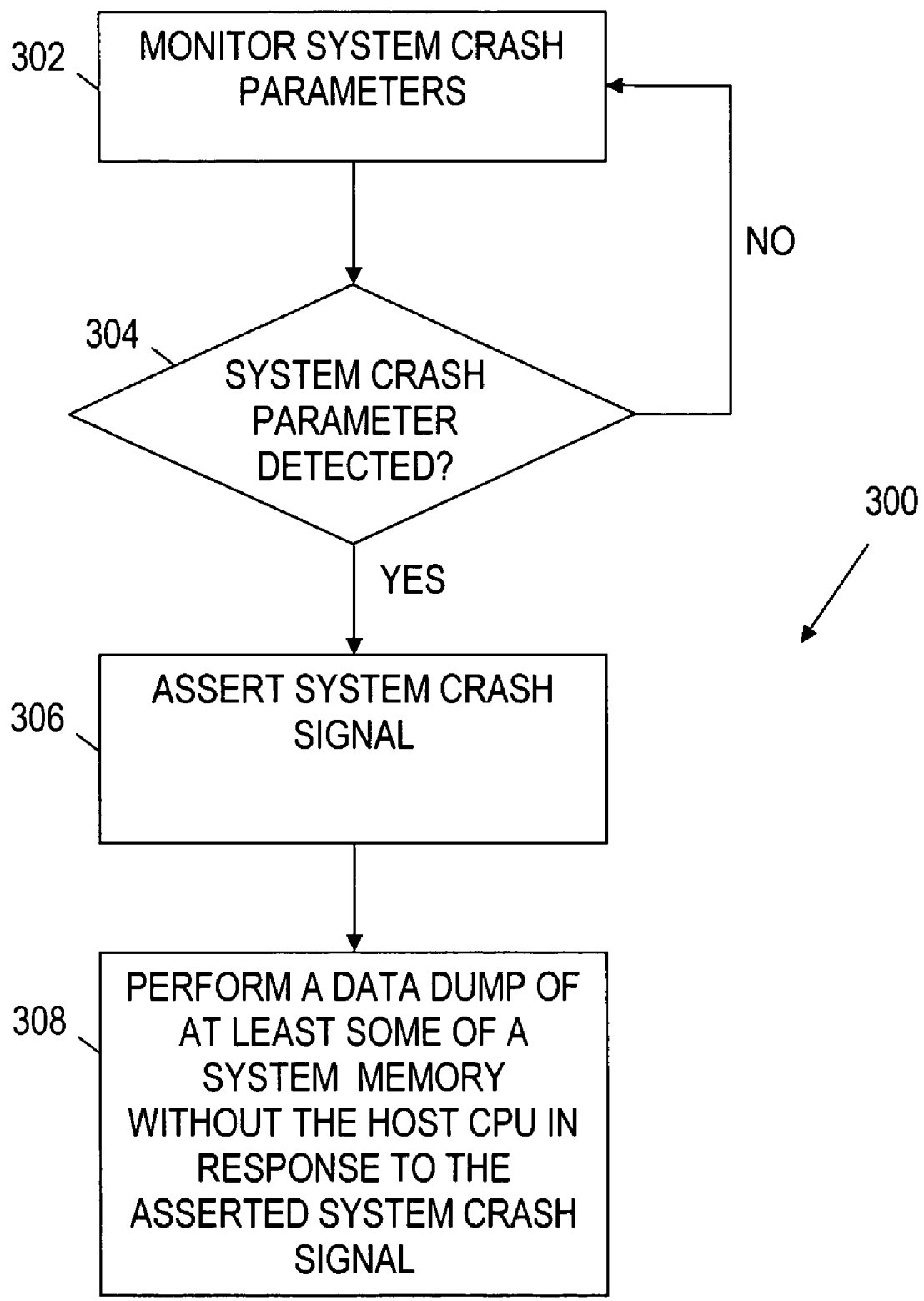
FIG. 3 illustrates a method in accordance with embodiments of the invention.

FIG. 3 illustrates a method 300 in accordance with embodiments of the invention. As shown in FIG. 3, the method 300 may comprise monitoring system crash parameters (block 302). If a system crash parameter is not detected at block 304, the method 300 cycles to monitoring system crash parameters (block 302). If a system crash parameter is detected at block 304, a system crash signal is asserted (block 306). In response to the asserted system crash signal, a data dump of at least some of a system memory is performed without a host CPU (block 308).

Figure 4:
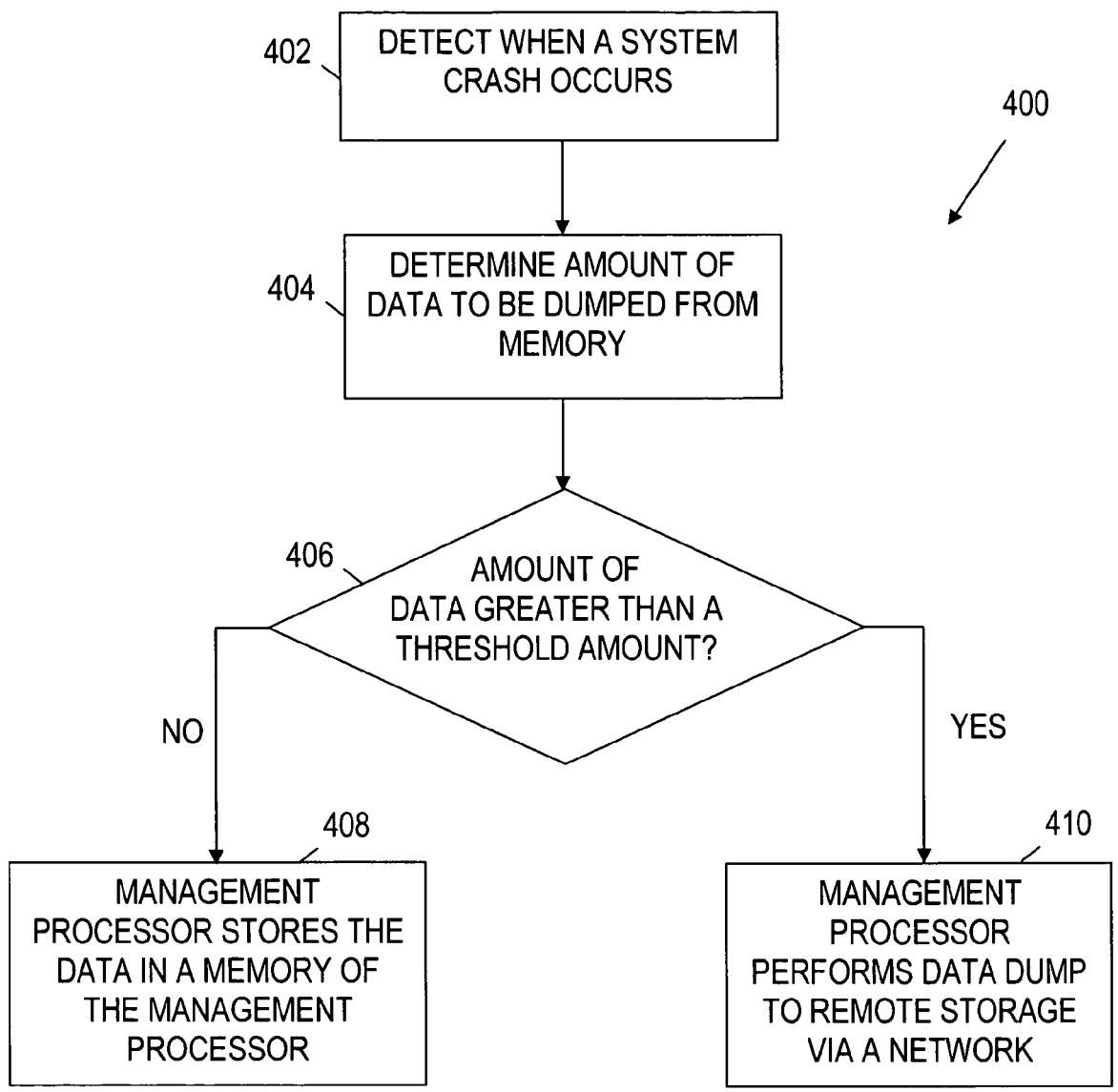
FIG. 4 illustrates an alternative method in accordance with embodiments of the invention.

FIG. 4 illustrates an alternative method 400 in accordance with embodiments of the invention. As shown in FIG. 4, the method 400 may comprise detecting when a system crash occurs (block 402). At block 404, an amount of data to be dumped from memory is determined. If the amount of data to be dumped is greater than a threshold amount as determined at block 406, data associated with the data dump is written to a remote storage via a network (block 410). If the amount of data is to be dumped is less than or equal to a threshold amount as determined at block 406, data associated with a data dump may be stored in a memory of a management device (block 408).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
 a host CPU;
 a system memory coupled to the host CPU; and
 a management device coupled to the host CPU and the system memory, wherein the management device is operable to permit remote control of the computer system by other computer systems and wherein the management device is configured to receive a signal when the computer system malfunctions and, in response to receiving the signal, perform a data dump of at least some of the data in the system memory without involvement of the host CPU;
 wherein the management device is operable to store data dump information in at least one of a plurality of separate storage devices according to a prioritization of the separate storage devices.

2. The computer system of claim 1 wherein the system memory stores a main operating system kernel that is executable before other operating system software modules and non-operating system software modules, and wherein the main operating system kernel comprises computer-readable instructions that, when executed, cause the host CPU to assert the signal when the computer system malfunctions.

3. The computer system of claim 1 wherein, after receiving the signal, the device is configured to perform the data dump of at least some of the data in the system memory without involvement of a main operating system of the computer system.

4. The computer system of claim 1 wherein the management device is configured to receive the signal via a virtual UART mechanism.

5. The computer system of claim 1 wherein the prioritization is based on a predetermined reliability of transferring data dump information to the separate storage devices.

6. The computer system of claim 1 wherein the prioritization is based on one or more factors that affect the reliability of transferring data dump information to the separate storage devices.

7. The computer system of claim 6 wherein the one or more factors are selected from the group consisting of a size of data dump information, an amount of space available in a memory of the management device, the correct operation of a network, and an amount of space available in a remote memory coupled to the network.

8. The computer system of claim 1 wherein the management device comprises a memory and wherein data associated with the data dump is read from the system memory and stored in said memory by the management device.

9. The computer system of claim 1 further comprising:
 a network coupled to the management device; and
 a remote storage coupled to the network,
 wherein the management device reads data associated with the data dump from the system memory and transmits the data to the remote storage via the network.

10. The computer system of claim 1 wherein the device is configurable to organize data associated with the data dump according to one or more factors selected from the group consisting of:
 a source of the data;
 a data type;
 hardware associated with the data;
 software associated with the data; and
 timing factors associated with the data.

11. The computer system of claim 1 wherein the device resets the computer system after performing the data dump.

12. A management sub-system, comprising:
 a sub-system processor;
 a sub-system memory coupled to the sub-system processor; and
 a bridge interface coupled to the sub-system processor, the bridge interface permits the management sub-system to couple to a host computer system;
 wherein, when coupled to the host computer system, the management sub-system is operable to detect a system crash of the host computer system,
 wherein, upon detection of the system crash, the sub-system processor is operable to execute computer-readable instructions stored in the sub-system memory that cause the sub-system processor to transfer an amount of data stored in a system memory of the host computer system to at least one of a plurality of storage devices,
 wherein the data is transferred without participation of a host CPU of the host computer system; and
 wherein the data is transferred to at least one of the plurality of storage devices according to a prioritization of the plurality of storage devices.

13. The management sub-system of claim 12 wherein the prioritization of the plurality of storage devices is based on a prediction of reliability.

14. The management sub-system of claim 13 wherein the sub-system processor is initially operable to transfer the data to the sub-system memory.

15. The management sub-system of claim 14 wherein, if there is not enough space in the sub-system memory to store the amount of data, the sub-system processor is operable to transfer the amount of data to a remote memory coupled to the management sub-system via a network.

16. The management sub-system of claim 15 wherein, if the sub-system processor is not able to transfer the amount of data to the remote memory, the sub-system processor is operable to transfer the amount of data to another storage device.

17. The management sub-system of claim 12 wherein, when the computer-readable instructions are executed, the sub-system processor organizes the amount of data according to one or more factors selected from the group consisting of a source of the data, a data type, hardware associated with the data, software associated with the data, and timing factors associated with the data.

18. The management sub-system of claim 12 wherein, when the computer-readable instructions are executed, the sub-system processor creates multiple copies of the amount of data.

19. The management sub-system of claim 12 wherein, when the computer-readable instructions are executed, the processor further causes the computer system to reset after the amount of data has been transferred.

20. A method performed by a management device, comprising:
    receiving a signal indicative of a system crash;
    determining an amount of data dump information;
    determining if a network is functional; and
    transferring the data dump information to at least one of a plurality of storage devices based on the amount of data dump information and based on whether the network is functional.

21. The method of claim 20 wherein transferring the data dump information to at least one of a plurality of storage devices comprises transferring the data dump information to a memory of the management device when the amount of data dump information is less than or equal to a threshold amount.

22. The method of claim 21 wherein transferring the data dump information to at least one of a plurality of storage devices comprises transferring the data dump information to a remote memory coupled to the management device via a network when the amount of data dump information is greater than the threshold amount.

23. The method of claim 22 wherein transferring the data dump information to at least one of a plurality of storage devices comprises transferring the data dump information to another memory when the amount of data dump information is greater than the threshold amount and the network is not functional.

24. A computer system, comprising:
    a CPU;
    a system memory coupled to the CPU;
    means for asserting a system crash signal; and
    means, separate from the CPU, for receiving the system crash signal, for performing a data dump in response to receiving the system crash signal to store data dump information in a storage device based on a prioritization of storage devices, and for enabling remote control of the computer system by other computer systems.

25. The system of claim 24 wherein the means for receiving the system crash signal, for performing a data dump, and for enabling remote control comprises a memory and wherein the means for receiving the system crash signal, for performing the data dump, and for enabling remote control is operable to read the data dump information from the system memory and to write the data dump information to said memory.

26. The system of claim 25 wherein the means for receiving the system crash signal, for performing a data dump, and for enabling remote control is further operable to write the dump information data to a remote memory via a network.

* * * * *